(12) United States Patent
Trandal

(10) Patent No.: US 10,770,871 B2
(45) Date of Patent: Sep. 8, 2020

(54) MECHANICAL ARRANGEMENT OF A SUBSEA SWITCHGEAR

(71) Applicant: ABB Schweiz AG, Baden (CH)

(72) Inventor: Arne Trandal, Ålesund (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/478,773

(22) PCT Filed: Jan. 10, 2018

(86) PCT No.: PCT/EP2018/050576
§ 371 (c)(1),
(2) Date: Jul. 17, 2019

(87) PCT Pub. No.: WO2018/134101
PCT Pub. Date: Jul. 26, 2018

(65) Prior Publication Data
US 2020/0036170 A1    Jan. 30, 2020

(30) Foreign Application Priority Data
Jan. 18, 2017 (EP) .................................. 17151905

(51) Int. Cl.
| | | |
|---|---|---|
| *H02B 1/28* | (2006.01) |
| *H02B 7/06* | (2006.01) |
| *E21B 33/035* | (2006.01) |
| *H01H 33/53* | (2006.01) |
| *H02G 9/02* | (2006.01) |
| *H02J 4/00* | (2006.01) |

(52) U.S. Cl.
CPC ............ *H02B 7/06* (2013.01); *E21B 33/0355* (2013.01); *H01H 33/53* (2013.01); *H02B 1/28* (2013.01); *H02G 9/02* (2013.01); *H02J 4/00* (2013.01)

(58) Field of Classification Search
CPC ...... E21B 33/0355; H01H 33/53; H02B 1/28; H02B 7/06; H02G 9/02; H02J 4/00
See application file for complete search history.

(56) References Cited

U.S. PATENT DOCUMENTS

| | | | | |
|---|---|---|---|---|
| 4,835,657 A * | 5/1989 | Parkhomenko | .......... | H02B 1/28 174/50.54 |
| 4,933,809 A * | 6/1990 | Boede | ................... | F02B 61/045 361/641 |

(Continued)

FOREIGN PATENT DOCUMENTS

| | | |
|---|---|---|
| EP | 1942514 A1 | 7/2008 |
| SE | 1600203 A1 | 6/2016 |

(Continued)

OTHER PUBLICATIONS

European Search Report Application No. EP 17 15 1905 Completed: Jun. 12, 2017; dated Jun. 20, 2017 12 pages.

(Continued)

*Primary Examiner* — Jacob R Crum
(74) *Attorney, Agent, or Firm* — Whitmyer IP Group LLC

(57) ABSTRACT

The present disclosure relates to a switching device unit for a subsea switchgear. The switching device unit includes a fluid tight switching device housing and switching devices arranged within the switching device housing. A plurality of the switching devices are aligned with each other along two parallel lines.

20 Claims, 6 Drawing Sheets

(56) References Cited

U.S. PATENT DOCUMENTS

| | | | |
|---|---|---|---|
| 2013/0286546 A1 | 10/2013 | Hazel et al. | |
| 2013/0286548 A1* | 10/2013 | Andrea | H02B 7/00 |
| | | | 361/603 |
| 2014/0098468 A1* | 4/2014 | Boe | H02G 1/10 |
| | | | 361/601 |
| 2016/0072284 A1 | 3/2016 | Stromsvik et al. | |
| 2016/0141843 A1* | 5/2016 | Kristensen | H02B 1/20 |
| | | | 361/611 |

FOREIGN PATENT DOCUMENTS

| | | |
|---|---|---|
| WO | 2008004084 A1 | 1/2008 |
| WO | 2008004086 A1 | 1/2008 |
| WO | 2015197140 A1 | 12/2015 |

OTHER PUBLICATIONS

European Search Report Application No. EP 17 15 1905 Completed: Jul. 26, 2017; dated Aug. 4, 2017 11 pages.
International Search Report and Written Opinion of the International Searching Authority Application No. PCT/EP2018/050576 Completed: Mar. 13, 2018; dated Mar. 21, 2018 13 pages.
Australian Examination Report No. 1 Application No. 2018209057 Completed: Feb. 12, 2020 3 pages.

* cited by examiner

MECHANICAL ARRANGEMENT OF A SUBSEA SWITCHGEAR

TECHNICAL FIELD

The invention pertains to subsea power distribution systems and in particular to a switching device unit for a subsea switchgear.

BACKGROUND

In subsea power distribution systems there is a need for subsea switchgears which are responsible not only for distributing incoming electric power to a number of subsea consumers, but also for breaking the electrical power in case of fault.

A subsea switchgear can be provided by placing a typical topside solution inside one pressure proof canister. Another possibility is to put pressure sensitive components in a number of separate pressure proof canisters and connect these to one another. By pressure proof canister is here meant that the pressure inside the canister remains substantially the same, no matter the surrounding pressure.

However, the above-mentioned solutions tend to end up being very large and heavy. They may also be complex to transport and to assemble on site.

Document US20130286546 A1 discloses a known subsea switchgear.

SUMMARY

A general object of the present invention is to provide a switching device unit which makes possible a very compact subsea switchgear. Other objects include providing a switching device unit with a high degree of scalability and design flexibility, while the switching device unit is also cost effective in both manufacture and installation.

According to the present invention these objects have been solved by a switching device unit for a subsea switchgear, the switching device unit comprising a fluid tight switching device housing and switching devices arranged within the housing, a plurality of said switching devices being aligned with each other along two parallel lines. In a most general aspect, the plurality of switching devices are aligned with each other along one line.

By the provision of a plurality of switching devices along a line the switching device unit, and thus a subsea switchgear with such a unit, becomes very compact. Furthermore, such a set-up is straightforwardly scalable as the number of switching devices can be adapted to the need of a particular installation. There may also be provided a surplus of switching devices on delivery of the switching device unit and the subsea switchgear, the excessive switching devices may be connected to later added subsea consumers as the number of subsea consumers increases.

Preferably, the switching devices are positioned as close together as is allowed by the other components of the switching device unit or the subsea switchgear. The switching devices may be positioned as close together as is allowed by cable bushings leading into the switching device unit. The switching devices may be positioned as close together as is allowed by penetrators leading into the subsea switchgear.

The present switching device unit makes possible a design of the overall subsea switchgear following the same fundamental design concept. The length of the subsea switchgear holding the switching device unit may be adapted to the number of switching devices. Likewise, the number of bushing openings and other provisions provided for the switching devices may be adapted to the number of switching devices.

The alignment of the switching devices along a line makes possible a uniform design of the switching device unit and other components of the subsea switchgear. Importantly, most housing power connections leading to and from the switching devices may be designed to have an equal length. All housing power connections leading to and from the switching devices may be designed to have an equal length.

Such housing power connections may include a power cable with a cable termination at each end. The power cable may be a HVAC extruded power cable. The cable termination may be electrical connector including a termination boot sealing the electrical connector. The housing power connection may be a so-called jumper cable.

It is a great advantage that most or all housing power connections can be designed to have an equal length, since power connections can be high cost products and larger purchase volumes may lower the price per unit.

The housing power connections are preferably adapted to connect each switching device to electrical equipment outside the subsea switchgear.

A plurality of switching devices being aligned with each other along a line can also be referred to as a linear arrangement of a plurality of switching devices. The plurality of switching devices may be aligned with each other along a straight line.

As has been mentioned, there is a plurality of switching devices in the switching device housing. There may be at least twelve switching devices arranged within the switching device housing.

At least six of the plurality of switching devices within the switching device housing may be aligned with each other along a line. For example, in a three-phase system, there may be three incoming phases and three outgoing phases.

The switching devices may be arranged along two parallel lines. In this way, the number of switching devices within the switching device unit can be doubled while still keeping the switching device unit or the subsea switchgear compact. Furthermore, in this way the housing power connections may be arranged such that small bend radiuses are avoided, which is beneficial for the housing power connections and for the electric field distribution. Also, a symmetrical structure and weight distribution of the switching device unit can be obtained, which is beneficial during transport and installation. There may be a first line of switching devices and a second line of switching devices. The housing power connection leading either directly or via further connections to a switching device of the first line can be led over the second line before exiting the subsea switchgear. In other words, the housing power connections leading to the switching devices of the first line traverse the switching devices of the second line. The two parallel lines of switching devices together with the cross-wise connection increases the bend radiuses of the housing power connections. There may be at least three switching devices in each of the two lines.

The respective switching devices of the first line may be arranged next to the respective switching devices of the second line. In other words, a transverse line drawn through the center of a switching device of the first line would pass the center of a switching device of the second line. Such a transverse line would be perpendicular to each one of the first and second lines.

In alternative, the respective switching devices of the first line may be arranged displaced or offset in relation to the respective switching devices of the second line. In this way, the switching devices of the two lines can be more closely packed together. Especially if the switching devices have a non-rectangular cross section, such as a circular cross section. Also, with an offset it may be more straightforward to arrange the housing power connections such that small bend radiuses are avoided.

The switching device housing may comprise bushing openings. A plurality of the bushing openings may be aligned with each other along a line, preferably a straight line. The advantages related with this feature are associated with the above discussed arrangement of a plurality of switching devices along a line.

The number of bushing openings preferably equals the number of switching devices. This means that each housing power connection entering the switching device housing is connected to an individual switching device, and each housing power connection exiting the switching device housing is connected to an individual switching device.

However, the number of bushing openings may also be greater than the number of switching devices. This could be the consequence of some housing power connections entering or exiting the switching device housing not being connected to a switching device. For example, a housing power connection entering the switching device housing may not be connected to a switching device. In a three-phase system, there may be three more bushing openings than switching devices. If there are two sets of three-phase incoming housing power connection, there may be six more bushing openings than switching devices.

The switching device unit may comprise a plurality of the aforementioned housing power connections. The housing power connections may be connected to electrical bushings arranged in the bushing openings. Such bushings provide a fluid tight passage through the switching device housing of the switching device unit.

The switching device unit is preferably filled with a first dielectric liquid. The switching device unit preferably comprises, or is connected to, a first pressure compensating device. This makes the switching device unit suitable for deepwater subsea use.

In accordance with the present invention, the initially mentioned objects have been solved by a subsea switchgear comprising a switching device unit as defined above.

The subsea switchgear may comprise a fluid tight external enclosure surrounding the housing power connections. This may mean that the external enclosure does not surround the entire switching device unit. The external enclosure may surround only the part of the switching device unit where the bushing openings are located.

The subsea switchgear may comprise a fluid tight external enclosure surrounding the switching device unit. The external enclosure may then be referred to as an outer tank and the switching device housing of the switching device unit may be referred to as an inner tank.

No matter if the external enclosure surrounds the entire switching device unit or only a part of it, the external enclosure may comprise penetrator openings a plurality of which may be aligned with each other along a line, preferably a straight line. The advantages related with this feature are associated with the above discussed arrangement of a plurality of switching devices along a line within the switching device unit.

The housing power connections may extend between the penetrator openings and the bushing openings. This entails that the housing power connections are located in the space defined by the external enclosure and the switching device housing.

Preferably, the distances d between most of the bushing openings and the associated penetrator openings are equal. This is one way of assuring that the length of most, or all, housing power connections are equal. More than half of, or even all, distances d between the bushing openings and the associated penetrator openings may be equal. This is one way of making possible that the length of at least half of, or most, or all, housing power connections are equal.

The bushing openings and the associated penetrator openings may be aligned with each other in the same plane. Also the associated switching devices may be aligned in said plane. Aligning two or three of the bushing openings the penetrator openings and the switching devices in the same plane facilitates the previously mentioned uniform design of the switching device unit and other components of the subsea switchgear.

The external enclosure may comprise a sloping side portion for the penetrator openings. This will hinder any gathering of any water inside the external enclosure around the penetrator openings, since any such water will be moved away by gravity.

In a similar manner, the switching device housing may comprise a sloping top portion for the bushing openings.

The external enclosure is preferably filled with a second dielectric liquid. The second liquid of the external enclosure may be the same kind of liquid as the first dielectric liquid of the switching device unit. However, preferably the first and second liquids are not of the same kind. The first dielectric liquid may be an insulating dielectric liquid, preferably a mineral oil. The second dielectric liquid may be an ester, preferably a synthetic ester. The external enclosure preferably comprises, or is connected to, a second pressure compensating device. The dielectric liquid and the pressure compensating device make the subsea switchgear suitable for deepwater subsea use.

BRIEF DESCRIPTION OF THE DRAWINGS

Specific embodiments of the invention will now be described, by way of example, with reference to the accompanying drawings, in which.

DETAILED DESCRIPTION

Figure 1:
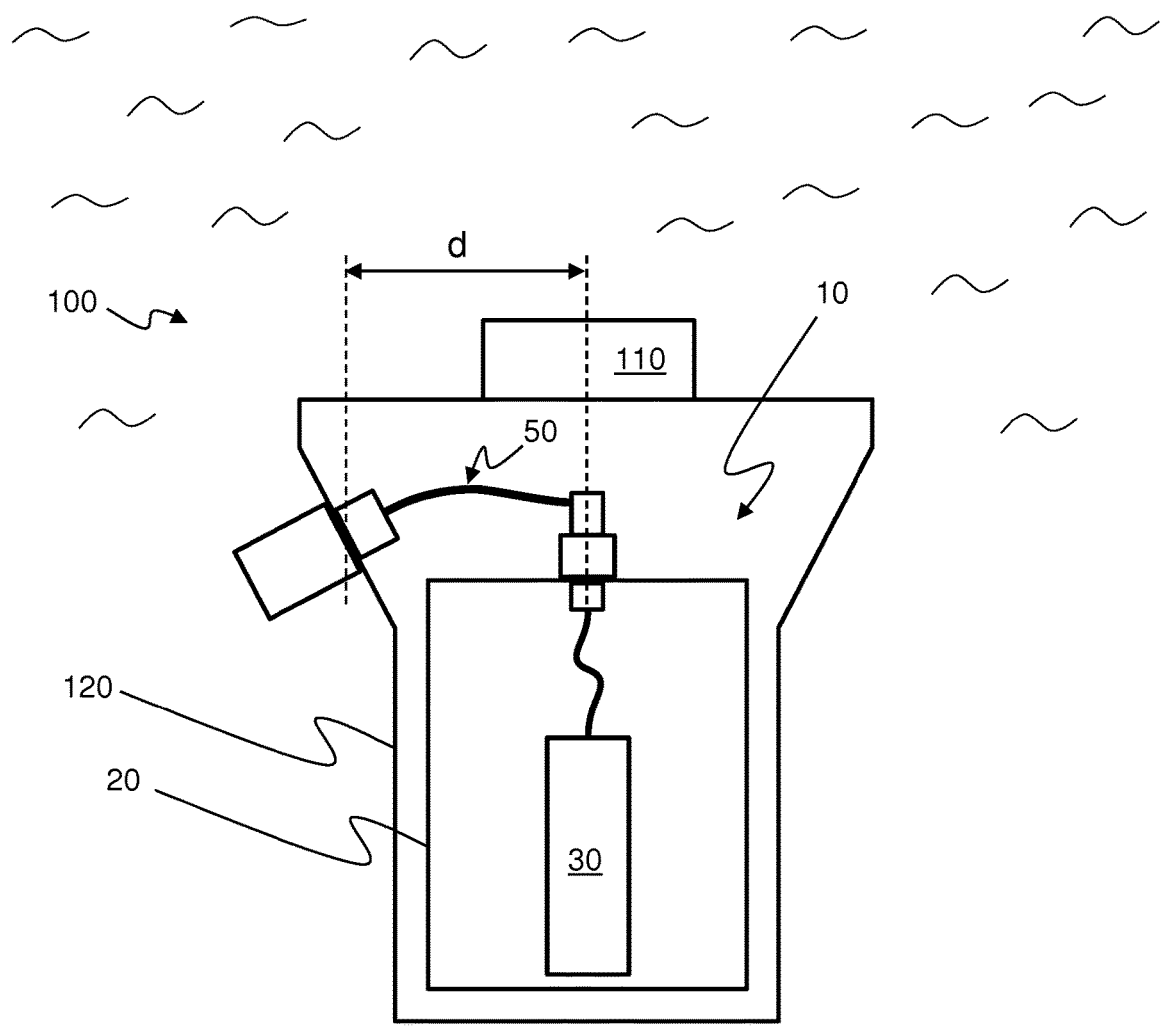
FIG. 1 is a schematic side view of an embodiment of a subsea switchgear with a switching device unit installed on the seabed.

FIG. 1 shows a subsea switchgear 100 with a pressure compensator 110 and an external enclosure 120 to which the pressure compensator 110 is connected. A switching device unit 10 is arranged inside and completely surrounded by the external enclosure 120. Even though not shown, the switching device unit 10 is also connected to a pressure compensator.

As is indicated in FIG. 1, the installed subsea switchgear 100 is surrounded by seawater and located on the seabed (the dashed wavy line in FIG. 1). The subsea switchgear 100 is connected to incoming electric power, typically to a power grid, by an incoming power line (not shown).

Figure 4:
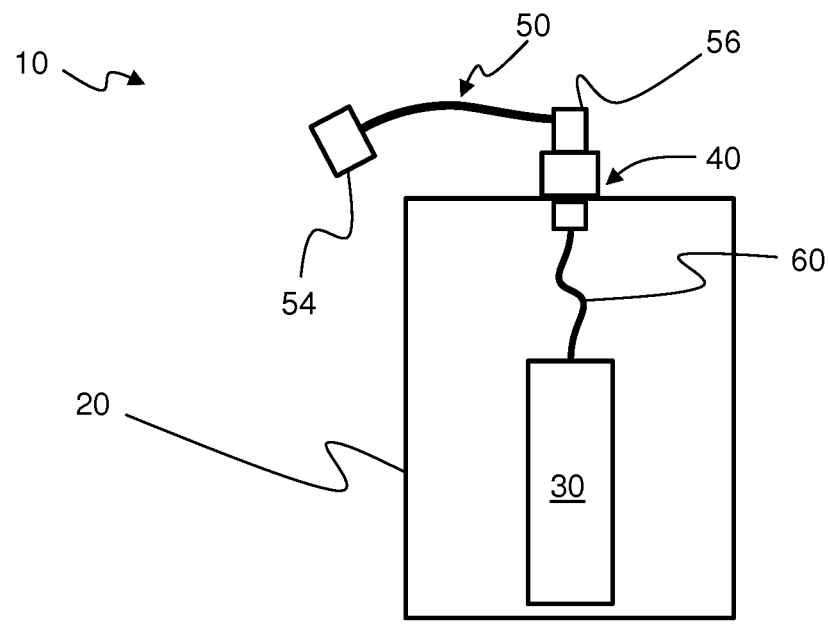
FIG. 4 is a schematic side view of only the switching device unit shown inside the subsea switchgear in FIG. 1.

The switching device unit 10, shown also in FIG. 4, comprises a switching device housing 20 containing a plurality of switching devices 30. The incoming power line is connected to the switching device unit 10 which in turn supplies a number of subsea consumers (not shown) with electric power.

The route of electric power entering and exiting the subsea switchgear 100 will now be described with reference to the figures. The incoming power line is connected via a penetrator 52 to the subsea switchgear 100. The penetrator 52 runs through and seals a penetrator opening 150 in the external enclosure 120.

On the inside of the penetrator opening 150 the penetrator 52 is electrically connected to a first electrical connector arranged within a first termination boot 54. The first termination boot 54 with the electrical connector inside is attached at one end of a power cable, the other end of which is attached to a second termination boot 56 surrounding a second electrical connector. The second electrical connector is electrically connected to a bushing 58 which runs through and seals a bushing opening 40 in the switching device housing 20. The bushing 58 is electrically connected to a switch connector 60 which leads the electric power to the switching device 30.

The first termination boot 54 with the first electrical connector, the power cable, and the second termination boot 56 with the second electrical connector are jointly referred to as housing power connection 50. The housing power connection 50 can be referred to as a power cable with a cable termination 54, 56 at each end. Such a housing power connection 50 can also be called a jumper cable 50 or simply a jumper 50.

Figures 2, 3:
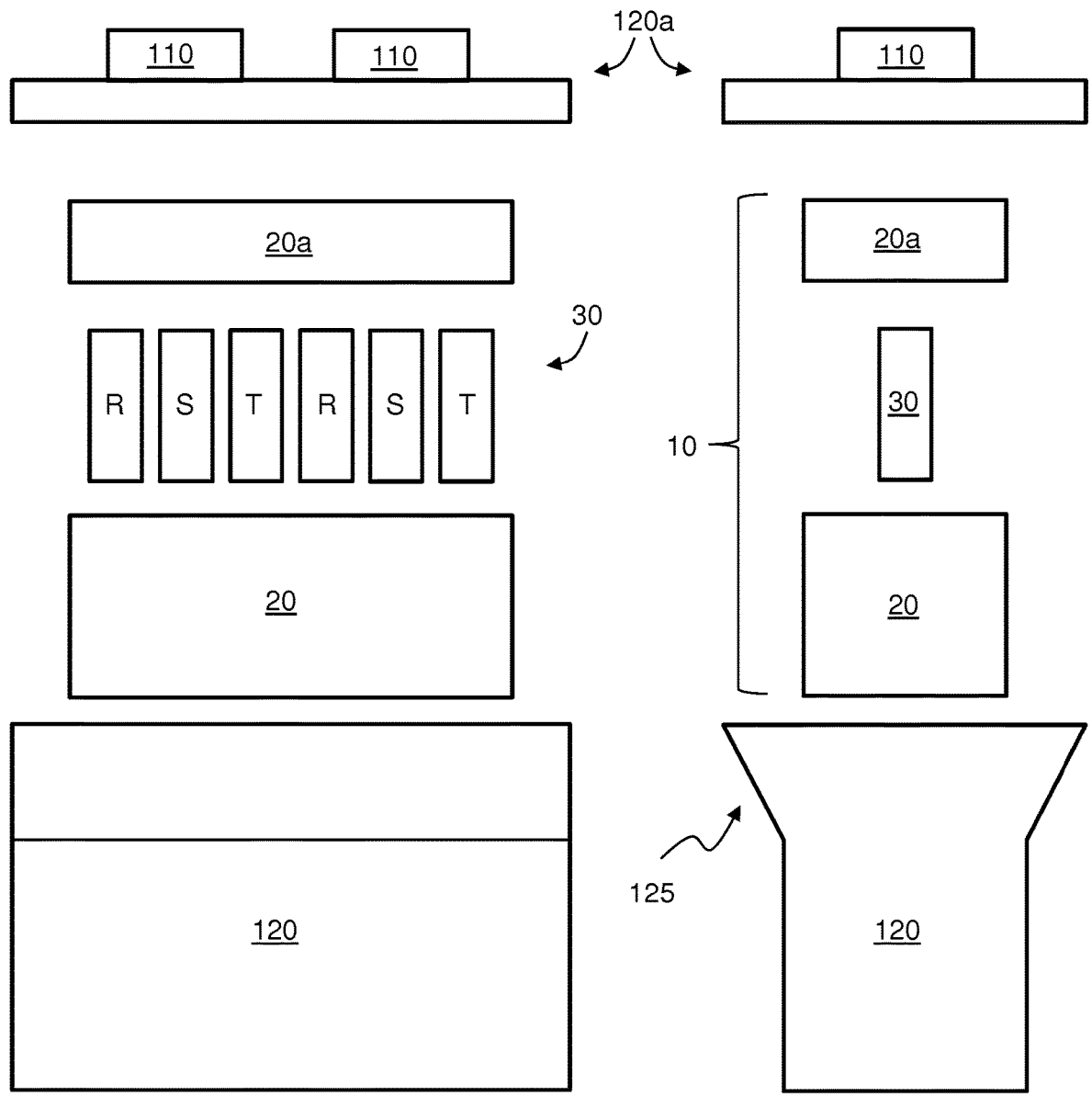
FIGS. 2 and 3 shows the subsea switchgear of FIG. 1 in exploded side and end views.

FIG. 2 illustrates the different components of the subsea switchgear 100 in exploded side view. As can be seen, there are preferably two pressure compensators 110 mounted on the external enclosure 120, or more precisely on an enclosure lid 120a that closes the external enclosure 120. Similarly, there is a housing lid 20a closing the switching device housing 20.

Figure 6:
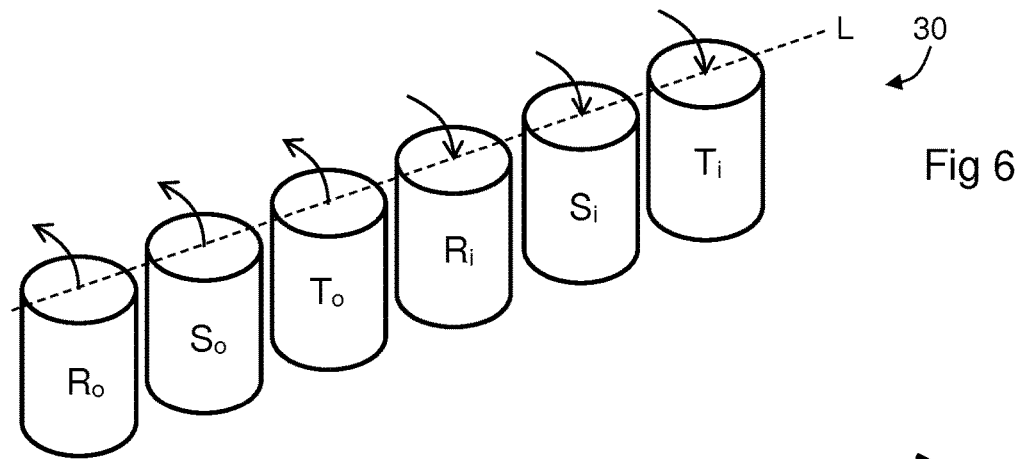
FIGS. 6-8 illustrate in perspective view three alternatives on how switching devices can be arranged within the switching device unit of any preceding figure.

As is clear from FIGS. 1, 2 and 3, there are six switching devices 30 arranged along a straight line inside the switching device housing 20. FIG. 6 illustrates these switching devices 30 in perspective, with a dashed line L running through the centers of each switching devices 30. The letters R, S and T denote the three different phases of a three-phase system. The subscripts i and o symbolize in or out.

Electric power entering the subsea switchgear 100 through the penetrator opening 150, the jumper 50 and the switch connector 60 to the switching device 30, for example the rightmost switching device marked Ti is led through a busbar (not shown) to the switching device marked To and from that switching device (To) follows the reverse path out of the subsea switchgear 100.

Figure 7:
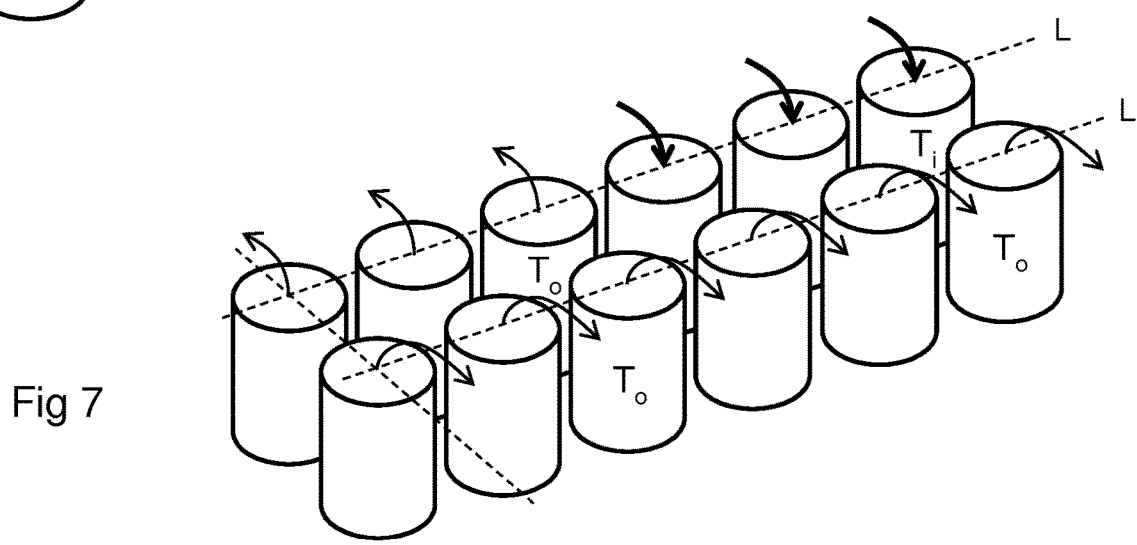

Typically, a subsea switchgear will comprise more than six switching devices 30. FIG. 7 discloses an example where the switching device housing 20 (not illustrated in FIG. 7) holds twelve switching devices 30. The switching devices 30 are arranged along two lines L which are parallel and adjacent each other. In this way, as indicated by the bent arrows that illustrate electric power entering and exiting the respective twelve switching devices 30, a symmetrical structure and weight distribution of the switching device unit 10 and the subsea switchgear 100 can be obtained. Two planes of symmetry can be drawn through FIG. 7.

In FIG. 7, the respective switching devices 30 of the top line L are arranged next to the respective switching devices 30 of the adjacent, bottom line L. Each switching device 30 of the top line L has a neighboring switching devices 30 in the bottom line L. The transverse dashed line shown to the left is perpendicular to the top and bottom dashed lines L. The switching devices 30 are arranged in a uniform grid pattern.

Electric power entering the top and rightmost switching device marked Ti in FIG. 7 is led through busbars (not shown) to the other three switching devices marked To and from these out of the subsea switchgear 100. Advantageously, the present invention quite simply makes possible to arrange for more than one incoming three-phase power feed.

Figure 8:
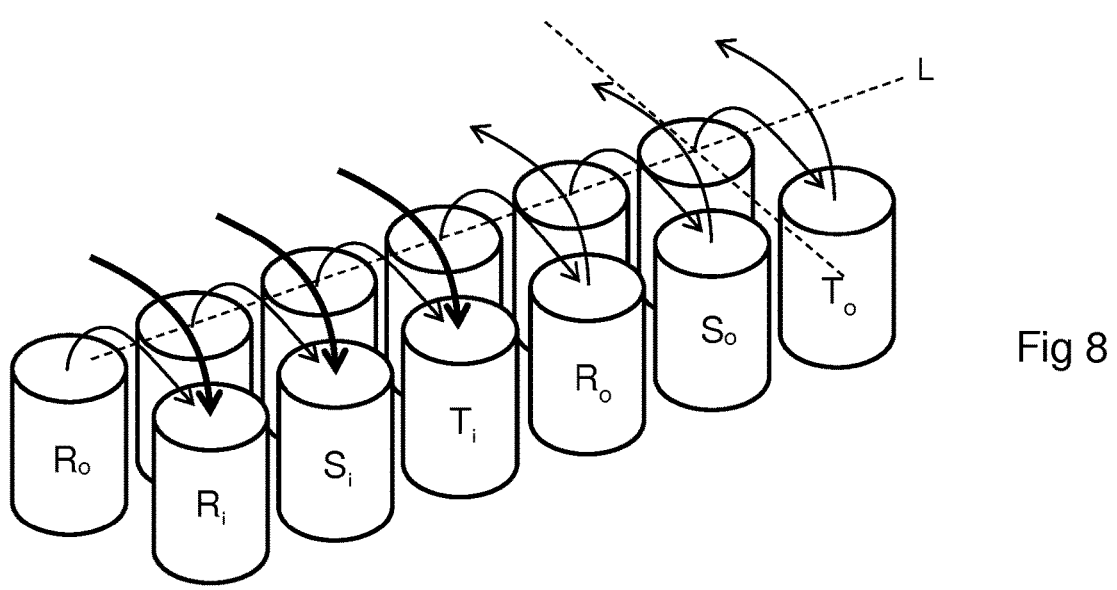

The switching device 30 configuration of FIG. 8 is very similar to that of FIG. 7, with the exception that the respective switching devices 30 of the top line L are displaced in relation to the respective switching devices 30 of the bottom line. The displacement of the respective switching devices 30 of the respective lines preferably equals half a width, or half a diameter, of a switching device 30. The displacement may equal half the center-to-center distance between two adjacent switching devices, as shown in FIG. 8. Each switching device 30 of the top line L preferably has a neighboring empty space between two switching devices 30 of the bottom line L. The switching device 30 preferably have a circular cross-section.

One advantage of the configuration of FIG. 8 is that is that power cable, in this case switch connectors 60, that electrically connect the switching devices 30 of one of the lines of switching devices 30 can be drawn across the other line without coming close to the top of the switching devices 30 of the other line and thus interfering with the switch connectors 60 of the switching devices 30 of the other line. This is indicated by the bend arrows that illustrate electric power entering and exiting the respective twelve switching devices 30 in FIG. 8.

Figure 9:
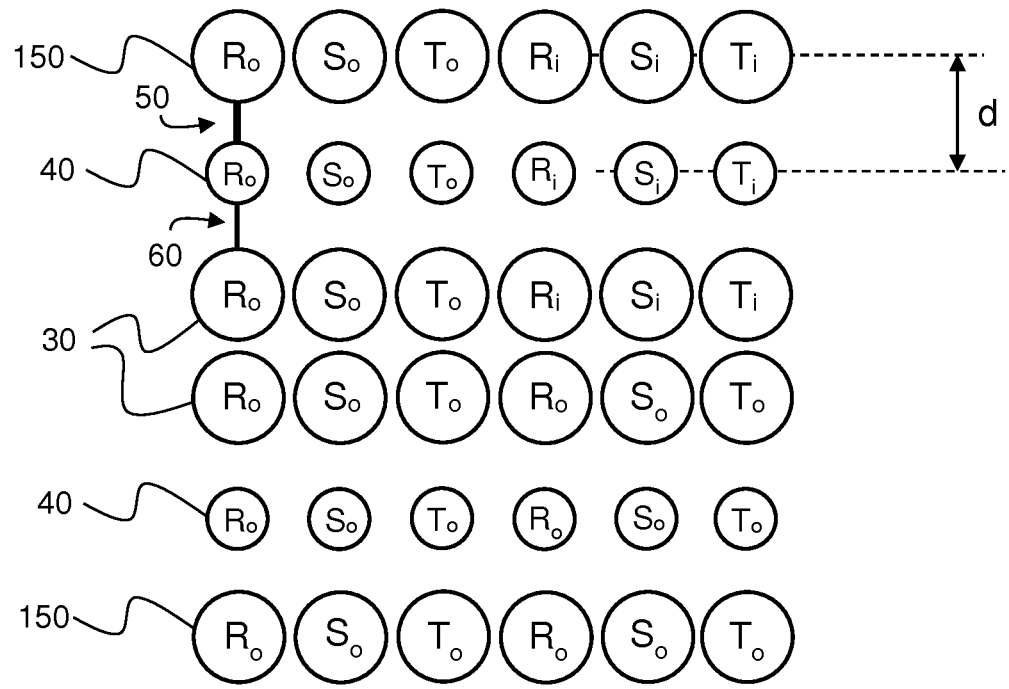
FIGS. 9 and 10 are top views that illustrate two alternatives on how switching devices as well as bushing openings can be arranged in the subsea switchgear of any preceding figure.
Figure 10:
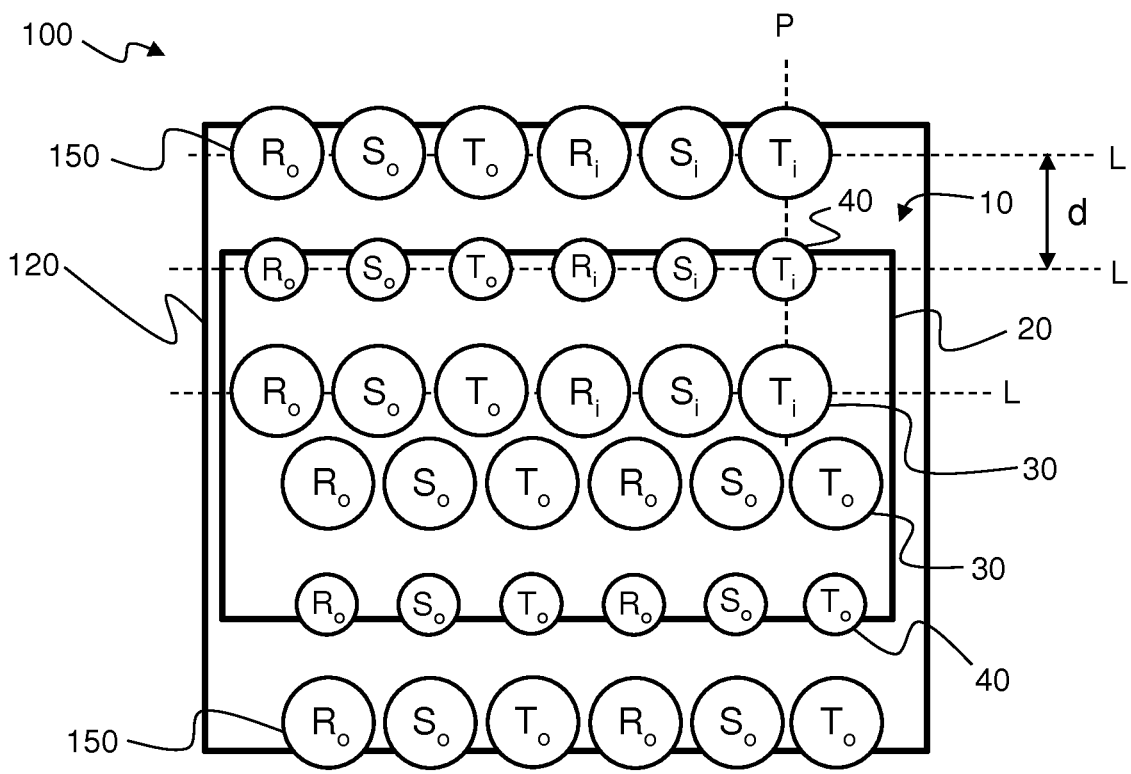

The configurations of FIGS. 7 and 8 are also illustrated in the top views of FIGS. 9 and 10, respectively. FIGS. 9 and 10 illustrate not only the twelve switching devices 30, but in addition the bushing openings 40 and the penetrator opening 150. Top left in FIG. 9, one switch connector 60 and one jumper 50 are also shown. The bushing openings 40 and the penetrator openings 150 are aligned with each other in the same plane P (indicated as a vertical dashed line P in FIG. 10). As can be seen in FIGS. 9 and 10, also the switching devices 30 are aligned in the same plane P.

It is to be understood that the above described different arrangements of the switching devices along two lines L can also be applied when the switching device housing 20 holds a different number than 12 switching devices.

The alignment of the switching devices 30 along one or two lines and the application of this design concept on the overall switchgear 100 in beneficial for the scalability and design flexibility. In FIG. 6, where there are three incoming and three outgoing phases, the bent arrows that illustrate electric power entering and exiting switching devices 30 are illustrated with the same thickness. In FIGS. 7 and 8 on the other side, where there are more (9) outgoing phase than incoming phases (3), the bent arrows that illustrate electric power entering switching devices 30 are illustrated with a greater thickness than the electric power exiting the switching devices 30. The greater thickness is meant to illustrate that more electric power is transferred. Now, advantageously, the present design concept is flexible in that it is straightforwardly possible to vary the number of incoming and outgoing phases (or incoming/outgoing power lines).

As mentioned, the alignment of the switching devices 30 along one or two lines make possible a uniform design of the switching device unit 10 and other components of the subsea switchgear 100. Most housing power connections, in the present case all switch connectors 60 and all jumpers 50 may be designed to have an equal length. As is to be apprehended, the bushing openings 40, the penetrator openings 150 and the switching devices 30 all aligned in the same plane P is one example of how to realize each switch connector 60 and each jumper 50 being of an equal length. The decisive fact for being able to use jumpers 50 of the same length is that the distance d (indicated in FIGS. 1, 9, 10 and 11) between the respective bushing opening 40 and the respective penetrator opening 150 is equal, they need not be positioned in the same plane P.

By providing a subsea switchgear 100 with the same distance d between most of the bushing openings 40 and most of the associated penetrator openings 150 the length of most jumpers 50 can be equal, which reduces the cost of the subsea switchgear 100. There is a jumper 50 extending from each bushing opening 40 to an associated penetrator opening 150. By providing a subsea switchgear 100 with the same distance d between each bushing opening 40 and each associated penetrator opening 150 the length of all jumpers 50 can be equal.

In FIGS. 1-4, the switching device unit 10 is completely surrounded by the external enclosure 120. Thus, the external enclosure 120 may be referred to as an outer tank 120 and the switching device housing 20 of the switching device unit 10 may be referred to as an inner tank 20. The external enclosure 120 is filled with a dielectric liquid and is pressure compensated by means of the two (there could also be one or more) pressure compensators 110. Pressure compensators are known to the skilled person, and could comprise bellows or flexible membranes that put the seawater is pressure contact with the dielectric liquid. In this way, the pressure within the external enclosure 120 essentially equals the pressure of the surrounding sea water. The switching device housing 20 also comprises or is connected to a pressure compensator (not shown) that ensures that the pressures within the external enclosure 120 and the switching device housing 20 are substantially equal. Thus, the pressure within the switching device housing 20 essentially equals the pressure of the surrounding sea water.

Figure 5:
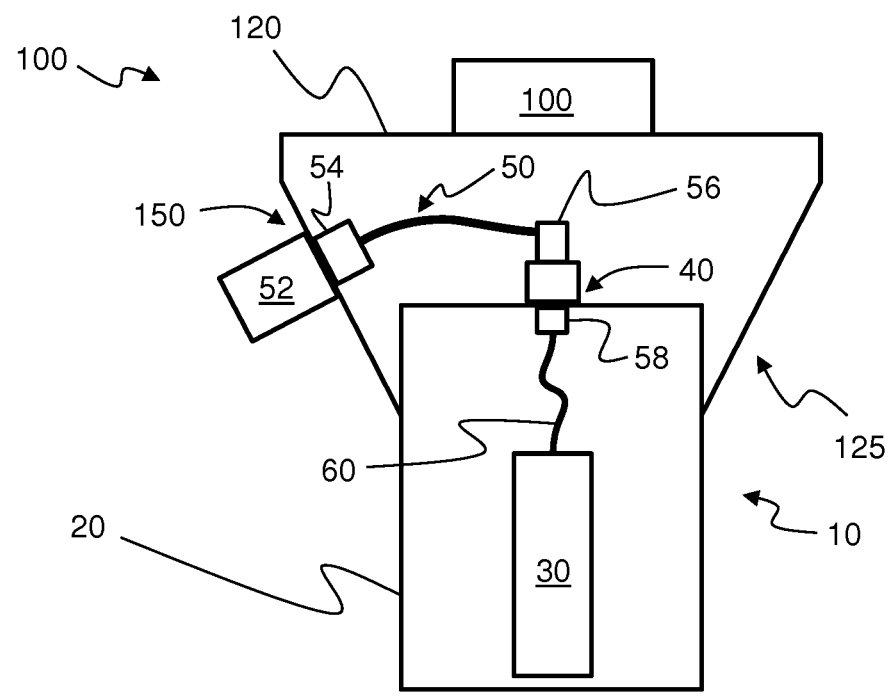
FIG. 5 is a schematic side view of another embodiment of a subsea switchgear with a switching device unit.

FIG. 5 shows an alternative to the above embodiment, where the switching device unit 10 is only partly surrounded by the external enclosure 120. However, there are still pressure compensators (not shown) ensuring that the pressure within the switching device housing 20 essentially equals the pressure of the surrounding sea water. As can be seen, the external enclosure 120 surrounds the jumpers 50. The external enclosure 120 surrounds the top portion of the switching device unit 10. In other words, the external enclosure 120 surrounds the part of the switching device unit 10 where the jumpers 50 are connected to the switching device unit 10.

One reason for having an external enclosure 120 completely surrounding the switching device housing 20 is that the components within the switching device housing 20 are then protected from seawater ingress by two walls 20, 120. Now, seawater ingress is most likely to occur where there is a wall opening in an enclosure/housing. The penetrator openings 150 and the bushing openings 40 form examples of such wall openings. These wall openings 150, 40 are to be sealed by the penetrator 52 and the bushing 58 and leakage is very unlikely. However, seawater ingress into the external enclosure 120 can be tolerated by the subsea switchgear 100. The jumpers 50 and any other equipment located on within the external enclosure 120 is adapted to function even if submerged in seawater instead of dielectric liquid.

Bearing in mind that seawater ingress is most likely (even though unlikely) to occur through the penetrator openings 150 and the bushing openings 40, it is to be appreciated that the embodiment of FIG. 5 is an adequate alternative to the embodiment of FIG. 4. The "two wall protection" of the components within the switching device housing 20 is most important where there are wall openings through the switching device housing 20.

Figure 11:
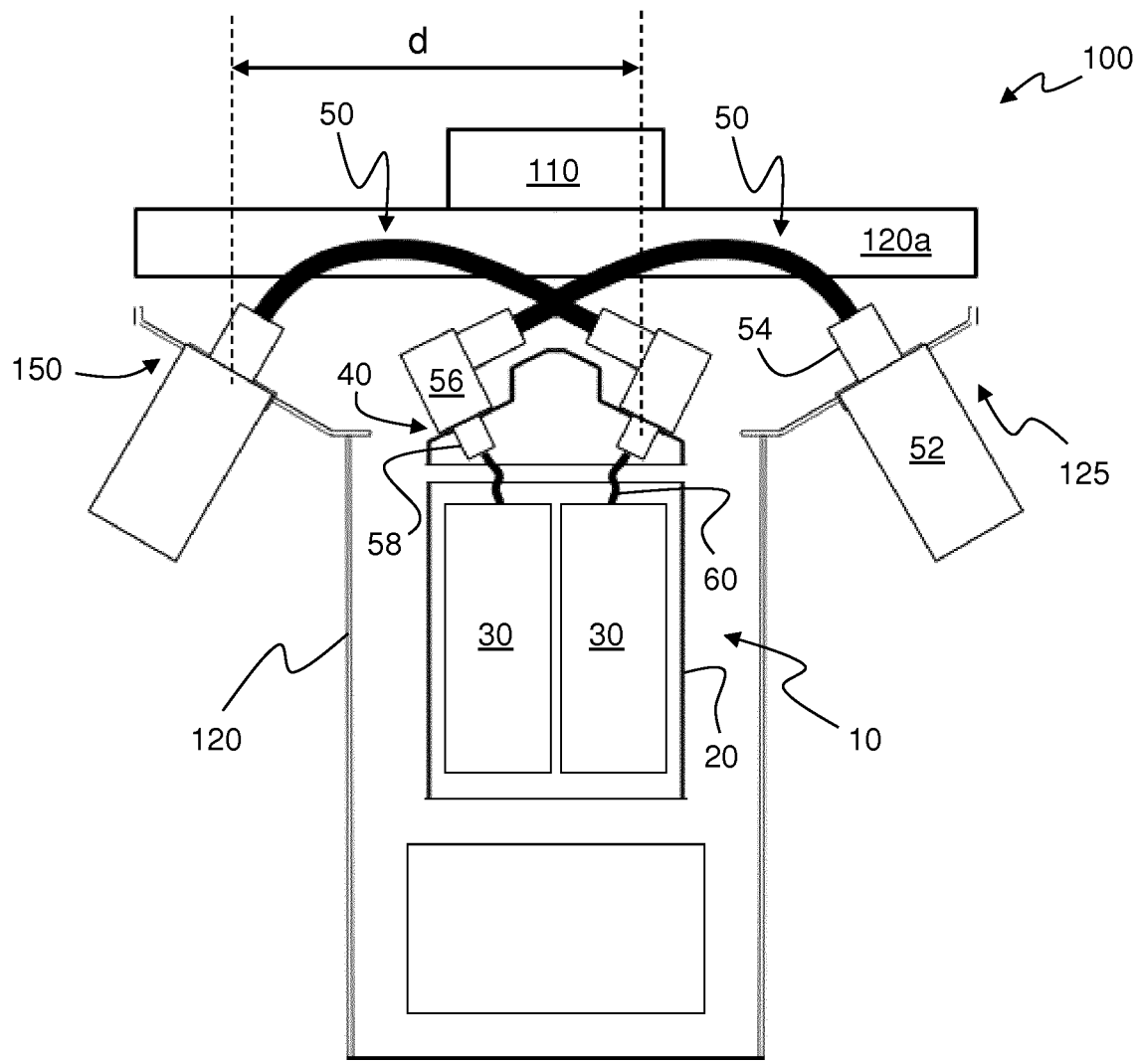
FIG. 11 is a schematic side view of yet another embodiment of a subsea switchgear with a switching device unit.
Figure 12:
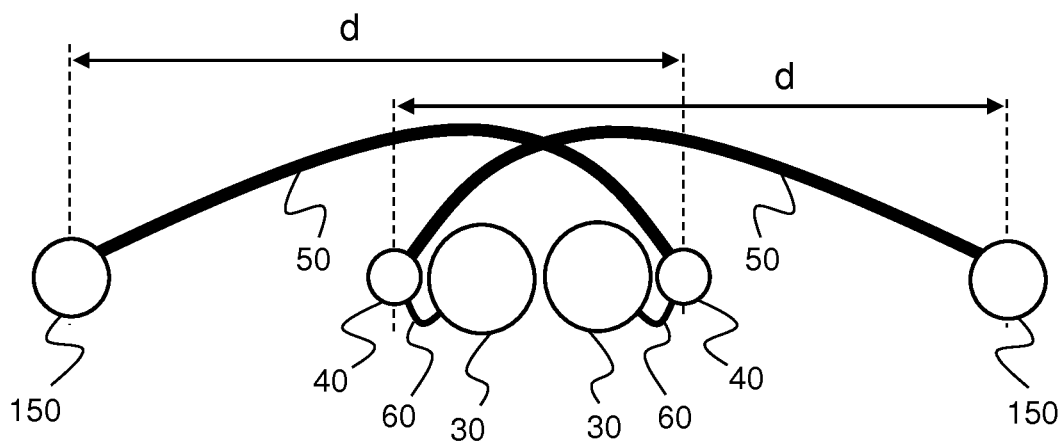
FIG. 12 is a schematic top view illustrating how switching devices as well as bushing openings and cabling there between can be arranged in the subsea switchgear of FIG. 11.

FIGS. 11 and 12 discloses a final embodiment of the present invention. The same reference numerals are valid throughout this disclosure, and aspects differing this final embodiment from the ones above will be focused on below.

FIGS. 11 and 12 clearly show how the two lines of switching devices 30 facilitate the use of jumpers 50 with small bend radiuses avoided. The jumpers 50 connected to the switching devices 30 on the right-hand side exit the external enclosure 120 on the left-hand side. In other words, jumpers 50 connected to bushing openings 40 on a first side are connected to penetrator openings 150 on a second side. Thus, jumpers 50 connecting switching devices 30 of a first line L traverse the switching devices 30 of a second, adjacent line L (compare FIG. 8) before reaching the penetrator openings 150. This cross-wise connection makes the length of the jumpers 50 increase which in turn increases the bend radius. The configuration of the switching device unit 10 with switching devices along a line L makes possible keeping the distance d between the bushing openings 40 and the penetrator openings 150 equal, so that cost effective same-length jumpers 50 can be used.

The two lines of switching devices 30 of FIG. 11 can be displaced as described with reference to FIG. 8 above, so that all jumpers 50 can traverse the lines of switching devices 30 without interfering with one another. The switching devices 30 may also be arranged in a uniform grid pattern as is shown in FIGS. 9 and 12, and the bushing openings 40 of the two lines L may be displaced in relation to another (not shown).

As is illustrated in FIGS. 1, 3, 5 and 11 the external enclosure 120 may comprise a sloping side portion 125 where the penetrator openings 150 are arranged. In other words, the external enclosure 120 may comprise a sloping side portion 125 where the jumpers 50 are connected to the external enclosure 120. In this way, any seawater contained within the external enclosure 120 will flow away from the jumpers 50 since seawater is heavier than the dielectric liquid within the external enclosure 120.

The sloping side portion 125 is a portion of the external enclosure 120 that forms an angle of 10 to 80 degrees to the horizontal, more preferably 20 to 60 degrees and most preferably around 30 degrees. The external enclosure 120 has a substantially vertical side portion and a sloping side portion 125. The sloping side portion 125 extends outwardly from the external enclosure 120. The sloping side portion 125 is positioned higher than the vertical side portion. In FIGS. 1, 3, 5 and 11 there are two sloping side portions 125, one on each side of the external enclosure 120. Penetrator openings 150 arranged on two sides of the external enclosure 120.

In the examples shown here, the jumper 50 comprises a straight cable termination 54 at a first (outer) end, and an elbow or 90 degrees cable termination 56 at the second (inner) end. The straight cable termination 54 is connected to the penetrator openings 150 of the external enclosure 120 and the elbow cable termination 56 is connected to the bushing openings 40 of the switching device housing 20.

In the embodiment of FIG. 11, the portion of the switching device housing 20 where the bushing openings 40 are located comprises sloping top portions. Any seawater contained within the external enclosure 120 will thus flow away from the jumpers 50 in the area of the bushing openings 40. Even though not indicated in FIGS. 4 and 5, there could be such sloping top portion(s) provided in those embodiments as well. Further, the embodiment of FIG. 11 could have a horizontal top portion, as shown in FIGS. 4 and 5.

The sloping top portions of switching device housing 20 have angles of inclination that match the above-mentioned angles. A sloping side portion 125 preferably has the same angles of inclination as the associated sloping top portion. By associated is meant that the sloping side portion 125 and the associated sloping top portion are associated with each other via the jumper 50 that extends between them.

In FIG. 11, a jumper 50 for a first side (right side in FIG. 11) switching device 30 is connected to a first side (right side) of the switching device housing 20 with the elbow termination 56 against a first sloping top portion. The jumper 50 then extends across the second side (left side) of the switching device housing 20 before meeting the sloping side portion 125 of the external enclosure 120 with the straight termination 54 (to the left in FIG. 11). Similarly, a jumper 50 for a second side (left side in FIG. 11) switching device 30 is connected to a second side (left side) of the switching device housing 20 with the elbow termination 56 against a second sloping top portion. The jumper 50 then extends across the first side of the switching device housing 20 before meeting the sloping side portion 125 of the external enclosure 120 with the straight termination 54 (to the right in FIG. 11).

The sloping top portions facilitates the jumpers 50 connected to the first and second side switching devices 30 crossing each other and crossing the switching device housing 20. Even more so of the lines L of switching devices 30 are displaced as shown in FIG. 8, or of the bushing openings 40 of the two lines L are displaced in relation to each other (not shown).

In FIG. 12, a top view illustration of the switching devices 30, the switch connectors 60, the bushing openings 40, the jumpers 50 and the penetrator openings 150 similar to the illustrations of FIGS. 9 and 10—shall help explain how the jumpers 50 for a first side extends across the second side of the switching device housing 20. The switch connectors 60 as well as the jumpers 50 are illustrated very schematically, in reality these typically extend vertically above the switching devices 30 and should be illustrated as straight lines from a bushing opening 40 to the associated penetrator opening 150.

The box below the switching device unit 10 indicates one or more step-down transformers, which typically form part of a subsea switchgear 100. The switching devices 30 may be circuit breakers 30. The circuit breakers 30, here illustrated as cylindrical objects, may comprise an actuator and a pair of contacts which can be maneuvered by the actuator. The bottom of the circuit breaker 30 may hold the actuator, and the contact pair may be arranged above the actuator. The pair of contacts may be arranged in vacuum. The circuit breakers 30 may comprise an actuator and a vacuum breaker. If a vacuum breaker is put to use, the part of the switching device 30 that encloses the vacuum chamber needs have a pressure resistant wall in order to maintain the pressure within the vacuum chamber constant no matter the pressure that prevails outside the vacuum chamber. The dielectric liquid outside the vacuum chamber is pressure compensated and thus adapted to the surrounding water pressure. The entire circuit breakers 30 may also comprise pressure resistant walls, so that the pressure within the circuit breakers 30 stays at or near 1 atmosphere no matter the pressure that prevails outside the circuit breakers 30.

In electrical power transmission and distribution, a circuit breaker can be defined as a fault triggered electrical switch with the purpose of protecting electrical consumers and cables from abnormal situations such as short circuit or overload. As mentioned, the switch comprises two contacts which are brought to engagement or disengagement by the actuator. A control means (not shown) is arranged to detect abnormal situations, or faults, and in response thereto send a signal to the actuator which then separates the contacts whereby power is cut off.

In addition to being fault triggered, the circuit breaker can be command controlled. The above-mentioned control means then receives a command from an operator or from a control system and in response thereto sends a signal to the actuator which opens or closes the switch.

In this disclosure, the term "subsea" is intended to specify a region close to the seabed at a depth of at least 100 m. However, the switching device unit and the subsea switchgear described above are adapted to function underwater at an overpressure of at least 100 atmospheres, such depths (greater than 1000 m) can also be defined as "deepwater subsea". The ability to function subsea or even deepwater subsea is obtained by the fluid tightness, the dielectric liquid filling and the pressure compensators.

In the context of this disclosure the meaning of switching devices being aligned with each other "along a line" should be clear to the skilled person. Each switching device has a longitudinal axis. Each switching device has a generally oblong shape and thus a longitudinal axis. The line L, along which the switching devices are aligned, crosses the longitudinal axis of each switching device. The line L is perpendicular to the longitudinal axis of each switching device. This can be pictured, as is clear especially from FIGS. 6-8, as the switching devices forming oblong objects placed standing side by side along a straight line L. Said straight line L being drawn though the center of each switching device. The switching devices are shown as oblong objects in the form of cylinders in FIGS. 6-8.

The invention claimed is:
1. A switching device unit for a subsea switchgear, the switching device unit comprising:
   a fluid tight switching device housing including bushing openings,
   a plurality of switching devices sealed within the same switching device housing, and
   housing power connections for connecting the switching devices through the bushing openings, wherein the switching devices are arranged along two parallel lines, there being at least three switching devices in each of the two lines, wherein the housing power connections leading to the first line of switching devices are led over the second line of switching devices, and wherein the switching device housing is a tank.

2. The switching device unit of claim 1, wherein at least twelve switching devices are arranged within the switching device housing.

3. The switching device unit of claim 1, wherein at least six of the plurality of switching devices arranged within the switching device housing are aligned with each other along a line.

4. The switching device unit of claim 1, wherein the plurality of switching devices are aligned with each other along straight lines.

5. The switching device unit of claim 4, wherein the respective switching devices of the first line are arranged displaced in relation to the respective switching devices of the second line.

6. The switching device unit of claim 1, wherein the housing power connections include a power cable with a cable termination at each end.

7. The switching device unit of claim 6, wherein the power cable is a HVAC extruded power cable.

8. The switching device unit of claim 1, wherein the switching device housing is filled with a first dielectric liquid and includes a first pressure compensating device.

9. A subsea switchgear comprising:

a switching device unit having:

a fluid tight switching device housing including bushing openings, a plurality of switching devices sealed within the same switching device housing, and housing power connections for connecting the switching devices through the bushing openings, wherein the switching devices are arranged along two parallel lines, there being at least three switching devices in each of the two lines, wherein the housing power connections leading to the first line of switching devices are led over the second line of switching devices, and wherein the switching device housing is a tank.

10. The subsea switchgear of claim 9 further includes a fluid tight external enclosure surrounding the housing power connections.

11. The subsea switchgear of claim 9 further includes a fluid tight external enclosure surrounding the switching device unit.

12. The subsea switchgear of claim 10, wherein the external enclosure includes penetrator openings, and wherein a plurality of said penetrator openings are aligned with each other along a line.

13. The subsea switchgear of claim 12, wherein the distances d between most of the bushing openings and the associated penetrator openings are equal, whereby a plurality of the housing power connections can be designed with the same length.

14. The subsea switchgear of claim 12, wherein the external enclosure includes a sloping side portion, and wherein the penetrator openings of the external enclosure are made in said sloping side portion.

15. The subsea switchgear of claim 10, wherein the switching device housing is filled with a first dielectric liquid and includes a first pressure compensating device.

16. The switching device unit of claim 2, wherein the housing power connections include a power cable with a cable termination at each end.

17. The switching device unit of claim 2, wherein the switching device housing is filled with a first dielectric liquid and includes a first pressure compensating device.

18. The subsea switchgear of claim 11, wherein the external enclosure includes penetrator openings, and wherein a plurality of said penetrator openings are aligned with each other along a line.

19. The subsea switchgear of claim 13, wherein the external enclosure includes a sloping side portion, and wherein the penetrator openings of the external enclosure are made in said sloping side portion.

20. The subsea switchgear of claim 15, wherein the external enclosure is filled with a second dielectric liquid and the subsea switchgear includes a second pressure compensating device.

* * * * *